United States Patent [19]

Shabtai et al.

[11] 3,999,880
[45] Dec. 28, 1976

[54] DRILLING FIXTURE FOR USE IN PRECISELY DRILLING LONG BORES

[76] Inventors: Joseph Shabtai, 41 Geulin St., Holon; Simon Assaraf, 91 Rothschild St., Rishon Lezion, both of Israel

[22] Filed: Aug. 6, 1975

[21] Appl. No.: 602,450

[52] U.S. Cl. .............................. 408/16; 408/109; 408/115
[51] Int. Cl.² ........................................ B23B 47/28
[58] Field of Search ........... 408/72, 72 B, 103, 112, 408/115, 115 B, 237, 241 B, 16, 108, 109

[56] References Cited

UNITED STATES PATENTS

| 917,488 | 4/1909 | Roberts | 408/109 |
|---|---|---|---|
| 2,507,204 | 5/1950 | Giern et al. | 408/241 B |
| 2,583,283 | 1/1952 | Volz | 408/109 |
| 3,626,513 | 12/1971 | Pytlak | 408/115 |
| 3,708,237 | 1/1973 | Kruse | 408/108 |
| 3,762,829 | 10/1973 | Yilmaz | 408/115 X |

FOREIGN PATENTS OR APPLICATIONS

| 684,406 | 12/1952 | United Kingdom | 408/16 |
|---|---|---|---|

*Primary Examiner*—Othell M. Simpson
*Assistant Examiner*—Z. R. Bilinsky
*Attorney, Agent, or Firm*—Benjamin J. Barish

[57] ABSTRACT

A drilling fixture for use in precisely drilling long bores in a workpiece, such as a door, comprises a pair of plates secured to each other in parallel spaced relationship, a sleeve mounted in the space between the pair of plates, and a pair of rotatable bearings carried by the sleeve for receiving the drill and securely holding same in position during the drilling operation. A clamp is secured to the pair of plates for clamping same to the workpiece in alignment with the longitudinal axis of the sleeve, and presetting means are provided for moving the sleeve at right angles to its longitudinal axis to thereby precisely preset same with respect to the workpiece. A pair of parallel sighting devices are fixed to the sleeve in spaced relationship along the sleeve longitudinal axis to precisely align the sleeve, and the drill when received therein, with the drilling axis.

7 Claims, 7 Drawing Figures

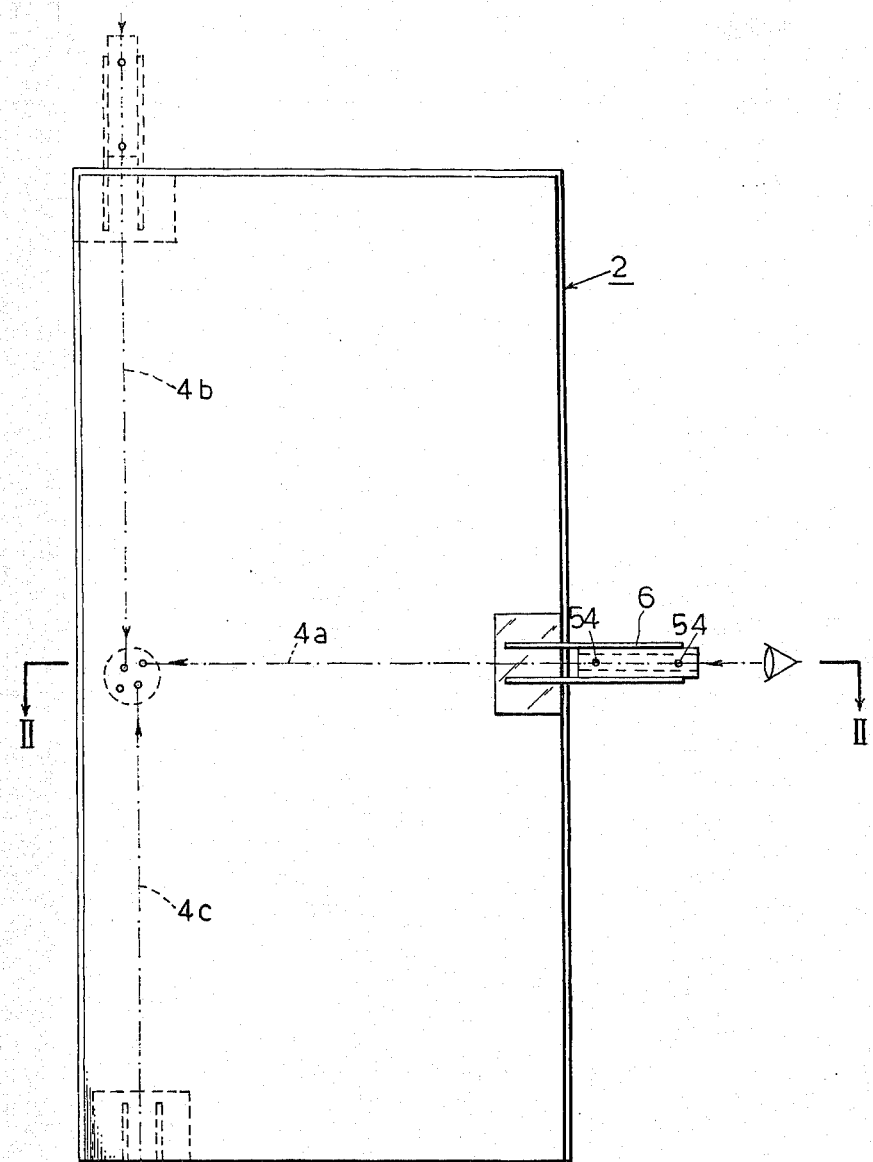
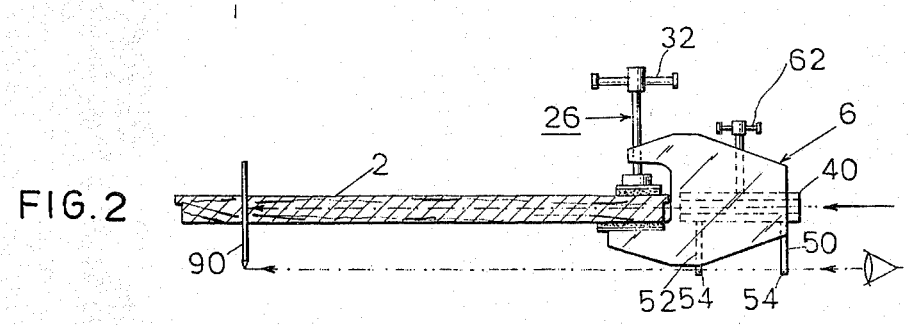

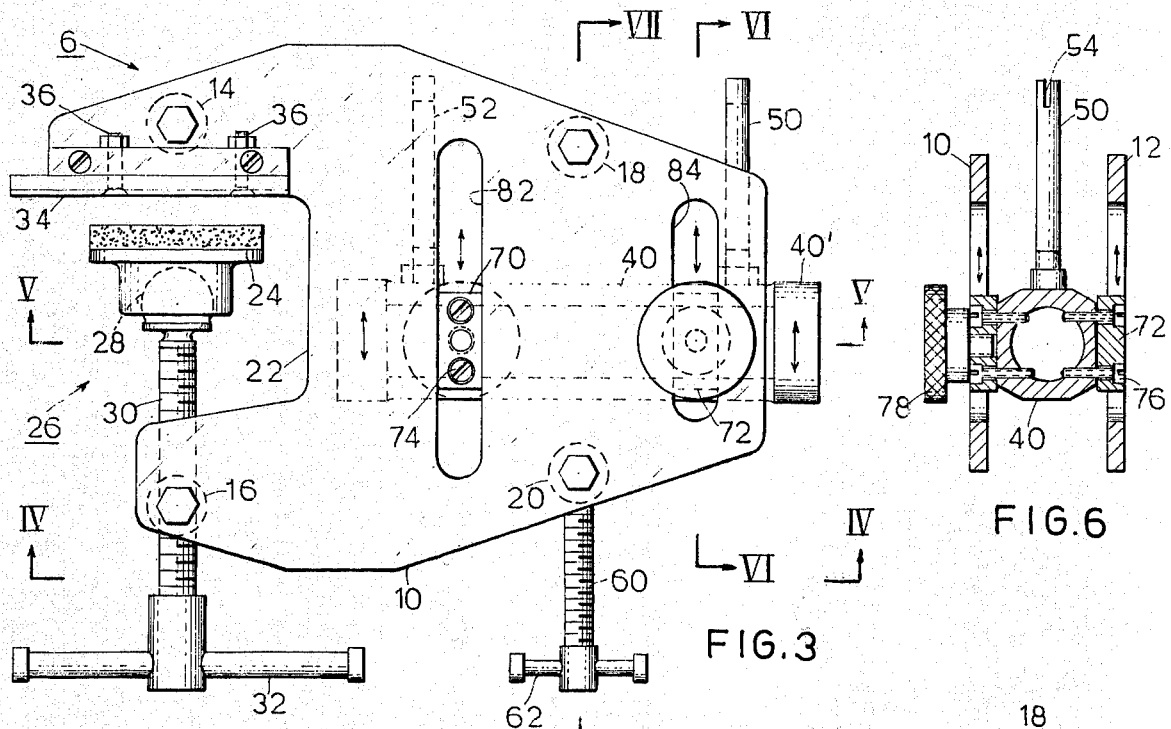
FIG.3
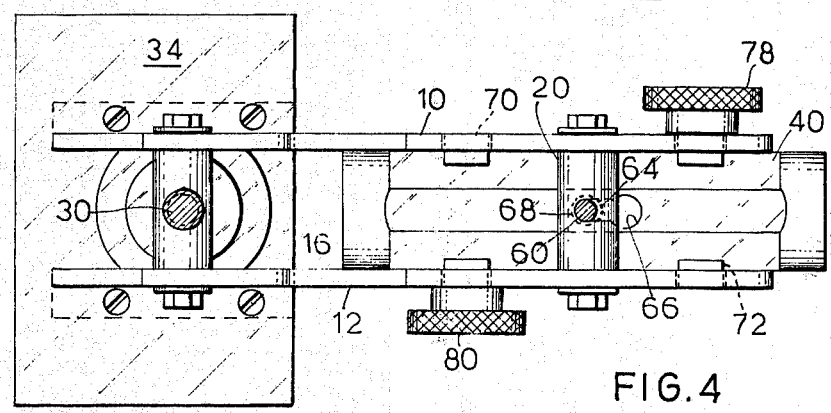
FIG.4
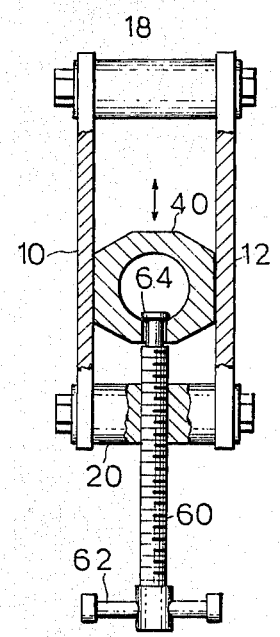
FIG.6
FIG.7
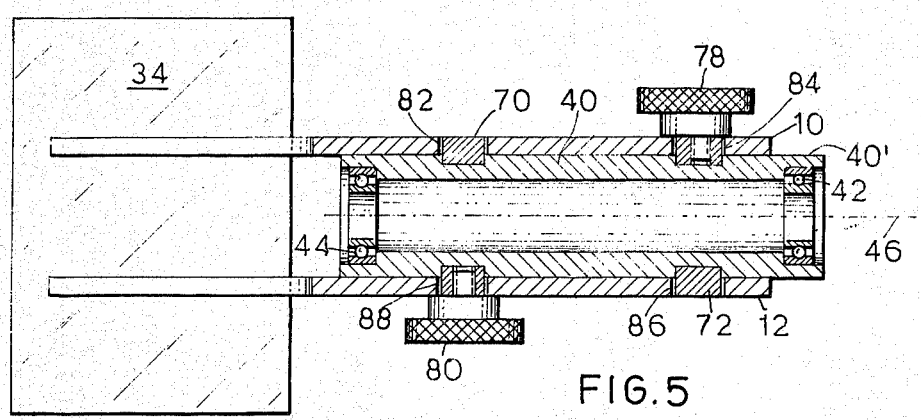
FIG.5

DRILLING FIXTURE FOR USE IN PRECISELY DRILLING LONG BORES

BACKGROUND OF THE INVENTION

The present invention relates to a drilling fixture for use in precisely drilling long bores in a workpiece. The invention is particularly useful for drilling bores in the order of a meter or more in length, such as required in the door security lock as described in our co-pending Pat. application Ser. No. 593,554 filed July 7, 1975.

The above-cited co-pending application describes a door security lock which includes three long rods passing through the door and actuated by the door key so as to be projected externally of the door into recesses formed in the door frame in order to securely lock the door from all sides against forced entry. One of the problems in including such a locking device in existing doors is the difficulty of precisely drilling the long bores in the door for receiving the locking rods. While the invention is described below particularly with respect to that application, it will be appreciated that it could be advantageously used in other applications requiring the precise drilling of long bores in the order of a meter or more for example.

SUMMARY OF THE INVENTION

The present invention provides a novel drilling fixture for use in precisely drilling long bores in a workpiece, comprising a pair of plates secured to each other in parallel spaced relationship, and a sleeve in the space between the pair of plates and including parallel flat surfaces on its opposite sides engaging the facing surfaces of the pair of plates. Rotatable bearings are carried by the sleeve for receiving the drill and for securely holding it in position within the sleeve during the rotation of the drill. A clamp is secured to the pair of plates for clamping them to the workpiece in alignment with the longitudinal axis of the sleeve, the clamp including a fixed jaw parallel to the longitudinal axis of the sleeve, and a movable jaw parallel to the longitudinal axis of the sleeve and movable at right angles to that axis. Presetting means are provided for moving the sleeve between the pair of plates in the direction at right angles to the longitudinal axis of the sleeve, with the flat surfaces of the sleeve in contact with the facing surfaces of the plates, to thereby precisely preset the sleeve, and the drill when received therein, with respect to the workpiece to which the fixture is clamped.

According to a further aspect of the invention, the fixture also includes a pair of parallel sighting device fixed to the sleeve in spaced relationship along the sleeve longitudinal axis to precisely align the sleeve, and the drill when received therein, with the drilling axis.

According to further aspects, the fixture also includes guiding means comprising a pair of guide elements fixed to the sleeve in spaced relationship along the longitudinal axis of the sleeve, one of the guide elements being movable in a slot formed in one of the fixture plates, and the other guide element being movable in another slot formed in the other fixture plate, both slots being at right angles to the longitudinal axis of the sleeve. The manually movable device of the presetting means is disposed between the two guide elements and their respective slots.

Further features, aspects and advantages of the invention will be apparent from the description below.

BRIEF DESCRIPTION OF THE DRAWINGS

The invention is herein described, by way of example only, with reference to the accompanying drawings, wherein:

FIG. 1 diagrammatically illustrates, for purposes of example, the use of the invention in drilling long bores through a door for inclusion of the long locking rods of the door security lock as described, e.g., in the above-cited co-pending application;

FIG. 2 is an end elevational view of the arrangement of FIG. 1;

FIG. 3 is an enlarged side elevational view of a drill fixture constructed in accordance with the invention for use in the application of FIGS. 1 and 2;

and FIGS. 4–7 are sectional views along IV—IV, V—V, VI—VI and VII—VII respectively of FIG. 3.

DESCRIPTION OF THE PREFERRED EMBODIMENT

FIGS. 1 and 2 illustrate the use of a drilling fixture constructed in accordance with the invention for precisely drilling the long bores required in a door in order to incorporate the locking rods described in the above-cited co-pending application for example, for securely locking the door from all three sides in addition to the free side of the door locked by the conventional rim lock. In FIG. 1, the door, generally designated 2, has to be provided with three long bores, schematically shown as 4a, 4b and 4c. The drilling fixture, generally designated 6, is used for supporting the drill while drilling each one of these three bores, as shown by the full lines illustration of fixture 6 for drilling bore 4a, and the broken line illustration of this fixture for drilling the other two bores. The specific manner of using fixture 6 for drilling each of these bores is described below following the description of the construction of the fixture.

The drilling fixture, as illustrated in FIGS. 3–7, includes a pair of plates 10, 12, secured to each other in parallel spaced relationship by four spacer pins 14, 16, 18, and 20. One end (left end, FIG. 3) of the two plates is formed with a rectangular recess 22 for receiving the movable jaw 24 of a clamp, generally designated 26. Jaw 24 is pivotably mounted by a universal joint 28 to a screw 30 threaded through spacer pin 16 and rotated by a handle 32. Movable jaw 24 cooperates with a fixed jaw 34 defined by a plate secured by means of fasteners 36 across both of the frame plates 10 and 12 of the fixture. Rotation of handle 32 enables the fixture to be clamped to a workpiece, namely door 2 of FIGS. 1 and 2, the latter being clamped between movable jaw 24 and fixed jaw 34 of the fixture.

Disposed between the frame plate 10 and 12 is a sleeve 40 having an extension 40' projecting from the end of the frame plates opposite to clamp 26. Sleeve 40 includes a roller bearing 42 at its front end, and another roller bearing 44 at its rear end, the two bearings being adapted to receive the drill and to securely hold same in position during the drilling operation. The longitudinal axis of sleeves 40 is precisely at right angles to screw 30 of clamp 26 so as to be in alignment with the workpiece (i.e. door 2, FIGS. 1 and 2) when it is attached thereto by clamp 26, fixed jaw 34 of the clamp being parallel to the longitudinal axis of sleeve 40, and movable jaw 24 being parallel to the fixed jaw and movable at right angles to the longitudinal axis of the sleeve.

Sleeve 40 is formed with a cylindrical bore or inner surface for receiving the drill bit, and with an octagonal outer surface to provide the parallel flat surfaces on its opposite side engaging the facing surfaces of the plates 10, 12. Accordingly, the sleeve may be precisely positioned by moving it between the two plates in the manner described below, the flat surfaces of the sleeve being in contact with the facing surfaces of the plates which firmly hold the sleeve in position during use.

The fixture further includes a pair of sighting devices, namely a front sighting device 50 fixed to the front end of sleeve 40, and a rear sighting device 52 fixed to its rear end. Both devices may be of tubular shape and fixed to the sleeve in any suitable manner, as by providing a depending threaded end on each device threaded into a bore in the sleeve. Both sighting devices are further formed with a slit 54 (FIG. 6) at their upper ends for sighting purposes.

The fixture further includes presetting means for moving sleeve 40 in the direction at right angles to its longitudinal axis 46 (FIG. 5) in order to precisely preset the sleeve, and the drill when received within its bearings 42, 44, with respect to the workpiece (door 2) when the fixture is clamped to the door. The presetting means illustrated in the drawings includes a screw 60 carrying a handle 62 at its outer end and threaded through spacer pin 20. The inner end of screw 60 passes through an opening in sleeve 40 and terminates in an out-turned rim 64 (FIG. 7) within the sleeve. Thus, rotating handle 62 will move the sleeve 40 in the direction at right angles to its longitudinal axis 46, this being the vertical direction in the views of FIGS. 3 and 7.

To facilitate the insertion of screw 60 into sleeve 40, the latter is preferably provided with a bayonette type slot (see FIG. 4), one end 66 of which is of larger diameter than the out-turned rim 64 of screw 60, the opposite end 68 of the slot being of smaller diameter than rim 64. Thus, to attach screw 60 to sleeve 40, the end of the screw may be passed through the larger diameter end 66, and then moved laterally into the smaller diameter end 68.

The presetting movement of sleeve 40 is guided by a pair of guide elements 70 and 72 secured to the sleeve by fasteners 74 (FIG. 3) and fasteners 76 (FIG. 6) respectively. These guide elements move within elongated slots formed in the frame plates 10 and 12 precisely at right angles to the longitudinal axis 46 of sleeve 40, and after the presetting operation has been completed, the precise position of the sleeve is fixed by means of a pair of threaded knobs 78 and 80 within additional slots formed in the frame plates. Thus, frame plate 10 includes two elongated parallel slots 82 and 84, slot 82 being used for guiding the movement of guide element 70 fixed to sleeve 40, and slot 84 being used for receiving the threaded knob 78 to fix the position of the sleeve with respect to that frame plate. Similarly, frame plate 12 includes slot 86 for receiving guide element 72 fixed to the opposite side of sleeve 40 for guiding its movement, and parallel slot 88 for receiving tightening knob 80.

The drill fixture is used in the following manner, reference being made particularly to FIGS. 1 and 2. The door 2, through which the long bores are to be drilled, is first removed from its hinges and supported on a horizontal supporting surface. A pin 90 is then inserted within an opening in the door to fix the precise axis of the bore to be drilled. The fixture 6 is then attached by means of clamp 26 to the door, while the viewer sites pin 90 via the slots 54 in the two sighting devices, 50 and 52. When pin 90, fixing the end point of the bore to be drilled, is thus targetted by sighting device 50 and 52, clamp 26 is tightened onto the door. The longitudinal axis of sleeve 40 is thus positioned precisely parallel to the longitudinal axis of the bore to be drilled, but the sleeve may not yet be precisely aligned with the bore axis. To effect this precise alignment, knobs 78 and 80 are loosened, and handle 62 is rotated which moves sleeve 40 exactly at right angles to its longitudinal axis, this being guided by guide elements 70 and 72 moving within slots 82 and 86 of the two frame plates 10 and 12. When the sleeve 40 is thus precisely positioned, this being the center of the door panel, knobs 78 and 80 are tightened.

The drill fixture 6 is now precisely positioned to receive the drill within sleeve 40 which securely holds the drill in this precise position as the bore is drilled.

The foregoing operation is repeated for each long bore (4a, 4b, 4c, FIG. 1) to be drilled in the door.

While the invention has been described with respect to a single preferred embodiment, it will be appreciated that many other variations, modifications, and applications thereof may be made.

What is claimed is:

1. A drilling-fixture for use in precisely drilling long bores in a workpiece, comprising:
   a pair of plates secured to each other in parallel spaced relationship;
   a sleeve mounted in the space between said pair of plates;
   said sleeve including parallel flat surfaces on its opposite sides engaging the facing surfaces of said pair of plates;
   rotatable bearings carried by said sleeve for receiving the drill and for securely holding same in position within the sleeve during the rotation of the drill;
   a clamp secured to the pair of plates for clamping same to the workpiece in alignment with the longitudinal axis of said sleeve, said clamp including a fixed jaw parallel to the longitudinal axis of the sleeve and a movable jaw parallel to the longitudinal axis of the sleeve and movable at right angles to said axis;
   presetting means including a manually-movable device for moving the sleeve between said pair of plates in the direction at right angles to the longitudinal axis of the sleeve, with said flat surfaces of the sleeve in contact with the facing surfaces of said plates, to thereby precisely preset the sleeve, and the drill when received therein, with respect to the workpiece to which the fixture is clamped and;
   a pair of parallel sighting devices fixed to the sleeve in spaced relationship along the sleeve longitudinal axis to precisely align the sleeve, and the drill when received therein, with the drilling axis.

2. A fixture according to claim 1, wherein the sleeve presetting means further includes a screw threadedly received in the fixture, said manually-movable device being a handle attached to one end of the screw for rotating same, the opposite end of the screw passing through an opening in the sleeve and terminating in an out-turned rim within the sleeve.

3. A fixture according to claim 2, wherein said pair of plates are secured to each other by a plurality of spacer pins, said presetting screw being threaded through one of said spacer pins.

4. A fixture according to claim 1, further including guiding means for guiding the movement of the sleeve during the presetting thereof, said guiding means including a guide element fixed to said sleeve movable in a slot formed in at least one of said plates at right angles to the longitudinal axis of the sleeve.

5. A fixture according to claim 4, wherein said guiding means includes a pair of guide elements fixed to said sleeve in spaced relationship along the longitudinal axis of the sleeve, one of said guide elements being movable in a slot formed in one of said plates and the other guide element being movable in another slot formed in the other of said plates, both said slots being at right angles to the longitudinal axis of the sleeve, said manually movable device of the presetting means being disposed between the two guide elements and their respective slots.

6. A fixture according to claim 5, wherein each of said plates is formed with two slots, one slot in each plate receiving a guide element on the sleeve, and the other slot in each plate receiving a threaded member for fixing the preset position of the sleeve with respect to the pair of plates.

7. A fixture according to claim 1, wherein said sleeve is formed with a cylindrical inner surface and with an octogonal outer surface.

* * * * *